US008000303B2

(12) United States Patent
Jeong et al.

(10) Patent No.: US 8,000,303 B2
(45) Date of Patent: Aug. 16, 2011

(54) METHOD AND APPARATUS FOR FREQUENCY SELECTION AT START OF SERVICE SESSION IN MBMS SYSTEM

(75) Inventors: Kyeong-In Jeong, Suwon-si (KR);
Kook-Heui Lee, Yongin-si (KR);
Soeng-Hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1503 days.

(21) Appl. No.: 11/239,688

(22) Filed: Sep. 30, 2005

(65) Prior Publication Data

US 2006/0072516 A1 Apr. 6, 2006

(30) Foreign Application Priority Data

Sep. 30, 2004 (KR) .................. 10-2004-0078110

(51) Int. Cl.
*H04B 7/216* (2006.01)

(52) U.S. Cl. ........ 370/335; 370/328; 370/329; 370/341; 370/312; 455/434; 455/450; 455/447

(58) Field of Classification Search .......... 455/436–440, 455/434, 450, 447; 370/312, 328, 329, 341
See application file for complete search history.

(56) References Cited

U.S. PATENT DOCUMENTS

| 7,031,708 | B2 * | 4/2006 | Sarkkinen et al. ............ 455/436 |
| 2004/0196803 | A1 | 10/2004 | Yi | |
| 2004/0253953 | A1 * | 12/2004 | Pedraza et al. ................ 455/436 |
| 2005/0245260 | A1 * | 11/2005 | Nielsen et al. ............. 455/435.1 |

FOREIGN PATENT DOCUMENTS

| EP | 1475 984 | 11/2004 |
| KR | 2005-0020720 A | 3/2005 |
| WO | WO 2004-015876 A2 | 2/2004 |

OTHER PUBLICATIONS

3GPP TSG RAN WG2#41 "Tracing and MBMS Bearer Establishment for UEs in URQA-PCH" Malaga, Spain; Feb. 16-20, 2004; XP-002337462.
Universal Mobile Telecommunications System (UMTS); Introduction of Multimedia Broadcast/Multicast Service (MBMS) In the Radio Access Network (RAN); Stage 2 (3GPP TS 25.346 Version 6.0.0 Release 6), Mar. 31, 2004; pp. 1-51; XP002367431; Retrieved from the Internet: URL:http://webapp.etsi.org/exchangefolder/ts-125346v060000p.pdf 'retrieved on Feb. 1, 2006.

* cited by examiner

*Primary Examiner* — Kamran Afshar
*Assistant Examiner* — Kathy Wang-Hurst
(74) *Attorney, Agent, or Firm* — Roylance, Abrams, Berdo and Goodman, LLP

(57) ABSTRACT

A method and an apparatus are disclosed for applying frequency layer convergence (FLC) to connected mode user equipments (UE) having no dedicated channel for a multimedia broadcast/multicast service (MBMS) service in a mobile communication system employing a Code Division Multiple Access (CDMA) scheme. The method and apparatus prevent uplink signaling congestion which may occur when the UEs located in non preferred frequency layers (NPL) of the MBMS service move to a preferred frequency layers (PL) when a MBMS service session starts. If the MBMS service session starts in a situation of applying the FLC, a radio network controller (RNC) notifies the UEs desiring to receive the MBMS service and located in NPLs for the MBMS service of FLC information including a PF value and a timer value, with reference to the number of the NPL UEs joining the MBMS service. The UEs performs a PF test according to the PF and timer values, thereby maintaining the degree of congestion and signal transmission load at appropriate levels.

20 Claims, 10 Drawing Sheets

METHOD AND APPARATUS FOR FREQUENCY SELECTION AT START OF SERVICE SESSION IN MBMS SYSTEM

PRIORITY

This application claims the benefit under 35 U.S.C. §119(a) of a Korean Patent Application entitled "Method and Apparatus for frequency Selection at Start of Service Session in MBMS System", filed in the Korean Industrial Property Office on Sep. 30, 2004 and assigned Serial No. 2004-78110, the entire contents of which are hereby incorporated by reference.

BACKGROUND OF THE INVENTION

1. Field of the Invention

The present invention relates to a multimedia broadcast/multicast service (MBMS). More particularly, the present invention relates to a frequency selection method and a frequency selection apparatus, which can maintain the degree of congestion of cells and the load of signal transmission at appropriate levels when a MBMS service session starts in a frequency layer convergence (FLC) situation where the MBMS service is provided in a preferred frequency layer (PL).

2. Description of the Related Art

Nowadays, according to developments in communication technologies, a mobile communication system implementing a wideband code division multiple access (CDMA) scheme not only provides conventional voice services, but also provides packet service communications for transmission of mass data and multimedia broadcast/communications for transmission of multimedia services. Therefore, in order to support the multimedia broadcast/communication, a MBMS service is actively being pursued for enabling services from one or more multimedia data sources to a plurality of user equipments (UE).

The term "MBMS" generally refers to a service which transmits the same multimedia data to a plurality of receivers over a radio network. In such a MBMS service, radio transmission resources can be saved by sharing one radio channel with the plurality of receivers. The MBMS service supports multimedia transmission formats such as real-time images, voices, still images, characters and the like and can simultaneously transmit voice data and image data according to the transmission formats, which represents that the MBMS service requires mass transmission resources. In a case of the MBMS service, the same data must be transmitted to cells where the users are located, so a point-to-point (PTP) access or a point-to-multiple (PTM) access is established.

FIG. 1 is a diagram illustrating conventional network architecture of nodes which provide MBMS services in a mobile communication network. Here is illustrated an architectural example in which the MBMS services are applied to a $3^{rd}$ Generation partnership (3GGP) Universal Mobile Telecommunication Service (UMTS) system, a standard $3^{rd}$ asynchronous mobile communication scheme based on Global system for Mobile Communications (GSM) and General packet Radio Services (GPRS).

Referring to FIG. 1, UEs 161, 162, 163, 171 and 172 denotes terminal apparatuses or subscribers capable of receiving the MBMS services, and cell 1 (designated by reference numeral '160') and cell 2 (designated by reference numeral '170') represents physical or logical service areas controlled by node B, that is, a base station apparatus which wirelessly transmits MBMS related data to the subscribers. A radio network controller (RNC) 140 controls the cells 160 and 170, selectively transmits multimedia data to a specific cell, and controls radio channels set for providing the MBMS services. Accesses between the RNC 140 and the UEs 161, 162, 163, 171 and 172 are gained via a radio resource control (RRC) interface. The RNC 140, the Node B and the cells 160 and 170 are inclusively referred to as a UMTS Terrestrial Radio Access Network (UTRAN).

The RNC 140 is connected to a packet switched or packet service (PS) network, such as Internet, by a serving GPRS support node (SGSN) 130. Communications between the RNC 140 and the PS network implemented by packet switched signaling (PS signaling). In particular, an access between the RNC 140 and the SGSN 130 is referred to as an 'Iu-PS interface'. The SGSN 130 controls MBMS related services of the respective subscribers. As a typical example, the SGSN 130 serves to manage data related to service charging for the subscribers and selectively transmit multimedia data to a specific RNC 140.

A transit network (transit NW) 120 provides a communication path between a broadcast/multicast service center (BM-SC) 110 and the SGSN 130, and may be connected to an external network through a gateway GPRS support node (GGSN) (not shown). The BM-SC 110, a source of MBMS data, is responsible for scheduling of the MBMS data.

The RNC 140 is connected to a circuit switched (CS) network by a mobile switching center (MSC) 150. The CS network signifies a legacy communication network which is centered on voice as an access basis. Communications between the RNC 140 and the MSC 150 is implemented by circuit switched signaling (CS signaling). In particular, an access between the RNC 140 and the MSC 150 is referred to as an 'Iu-CS' interface.

MBMS data streams generated by the BM-SC 110 reach the UEs 161, 162, 163, 171 and 172 through the transit NW 120, the SGSN 130, the RNC 140 and the node B/cells 160 and 170.

Although not shown in FIG. 1, a plurality of SGSNs may exist with respect to one MBMS service, and a plurality of RNCs may exist with respect to each of the SGSNs. Each of the SGSNs selectively transmits data to the plurality of RNCs, each of which, in turn, selectively transmits the data to the plurality of cells. To this end, a list of subordinate nodes to which data streams are to be transmitted (that is, a list of RNCs in a case of the SGSN and a list of cells in a case of the RNC) is stored such that the MBMS data are selectively transmitted later to only the stored nodes.

FIG. 2 is a diagram illustrating conventional procedures between a UE and a network, which are performed for a MBMS service. Here, a BM-SC 206 communicates with the UE 202 through a RNC 204. Also, the RNC 204 communicates with the BM-SC 206 through a SGSC (not shown). Although only one RNC 204 and only one UE 202 are shown in the drawing, it is obvious that the same procedures can be applied to a plurality of UEs desiring to receive the MBMS service and a plurality of RNCs controlling the plurality of UEs.

Referring to FIG. 2, a subscription step 210 represents a process in which a user desiring to receive the MBMS service, that is, the UE 202 is registered with a service provider, that is, the BM-SC 206. In the subscription step 210, the service provider (for example, the BM-SC 206) and the user (for example, the UE 202) exchange basic information related to service charging or service reception with each other.

In an announcement step 220, the UE 202 acquires basic information on the MBMS service. For example, the UE 202 detects MBMS IDs for discerning MBMS services, which the BM-SC 206 can provide to the UE 202, from each other, service initiation time, service duration and so forth. Here, the MBMS ID comprises a multicast address and an access point name (APN).

In the announcement step 220, nodes located between the BM-SC 206 and the UE 202, such as the RNC 204, the SGSN, a transit NW and the like, detect the UE 202 and nodes connected to the UE 202. For example, the SGSC detects a list of UEs desiring to receive the MBMS service at a lower level of the SGSN and a list of RNCs in which the UEs are located. Afterwards, the SGSN transmits MBMS data to the RNCs, in which the UEs are located, with reference to the lists.

The UE 202 having acquired the basic information on the MBMS service performs a joining step 230 for receiving the MBMS data. In the joining step 230, the UE 202 transfers at least one interest MBMS ID of the MBMS IDs acquired through the announcement step 220 to the BM-SC 206.

A notification step 240 represents a process for paging the UE 202 in order to notify the UE 202 that a session of the MBMS service, which the UE 202 joins, starts and the MBMS service will begin soon. In the notification step 240, group paging for a plurality of UEs joining the MBMS service is performed.

A radio resource allocation step 250 represents a process in which a radio resource is allocated between the UE 202 and the RNC 204 so as to actually provide the MBMS service, and information on the radio resource allocation is published to related nodes. In the notification step 250, the RNC 204 may determines a PTM transfer mode or a PTP transfer mode based on information on the number of UEs belonging to each subordinate cell and a radio resource management function.

In a data transfer step 260, the MBMS data are actually transmitted to the UE 202 through the RNC 204. When a need to change information related to the MBMS service exists, for example, a ciphering key in the data transfer step 260, the RNC 204 carries new information related to the MBMS service on MBMS control information to transmit the new information to all the UEs which are receiving the MBMS service.

If the MBMS session ends, in a radio resource release step 270, the allocated radio resource is released and the UE 202 is notified of the MBMS radio resource release. Although not shown in the drawing, the UE 202 may also spontaneously request to stop the reception of the MBMS service and stop the MBMS service reception on the way of receiving the MBMS service in step 250.

Recent MBMS systems support a FLC technology in which preferred frequency bands are allocated to each affordable MBMS services to enable UEs using the MBMS services to receive desired MBMS services at preferred frequencies. FLC information indicates the preferred frequencies corresponding to the respective MBMS services. At this time, a cell of a preferred frequency selected for a specific MBMS service is referred to as a preferred frequency layer (PL), and cells of other frequencies are referred to as non preferred frequency layers (NPL). Usually, only a corresponding MBMS service can be provided in the PL. However, it is not always possible to provide the corresponding MBMS service by the NPL. That is, in spite of the FLC, the corresponding MBMS service may be provided for UEs left to the NPLs.

In the FPL technology of the conventional MBMS system which operates as stated above, when the MBMS service starts, the UTRAN determines the PL of the MBMS service and transmits a message informing UEs located in subordinate cells of the MBMS service starting and the determined PL. In such a situation, since connected mode UEs, which subscribe to the MBMS service and are located in the NPLs of the MBMS service, move to the PL and then almost simultaneously attempt access for uplink signaling, there may be a problem in that uplink signaling congestion occurs.

SUMMARY OF THE INVENTION

Accordingly, the present invention has been made to solve at least the above-mentioned problem occurring in the prior art, and an object of the present invention is to provide a method and an apparatus for preventing uplink congestion occurring because user equipments (UE) located in non preferred frequency layers (NPL) almost simultaneously move to a preferred frequency layer (PL) when a multimedia broadcast/multicast service (MBMS) session starts.

An object of the present invention is to provide a method and an apparatus which use parameters such as a probability factor (PF) value and a timer value for controlling movements of UEs in order to apply frequency layer convergence (FLC) when a MBMS service session starts.

To accomplish the above-mentioned object, in accordance with one aspect of the present invention, a method is provided for controlling frequency selection in a MBMS system when a MBMS service session starts. The method comprises the steps of, if the MBMS service session starts, determining a PL for the MBMS service, and transmitting first PL information including a predetermined PF value for controlling frequency selection operations to the PL and representing the determined PL to connected mode UEs located in not the PL but non preferred frequency layers (NPL).

In accordance with another aspect of the present invention, a method is provided for performing frequency selection in a MBMS system when a MBMS service session starts. The method comprises the steps of, if the MBMS service session starts, receiving PL information including a predetermined PF value for controlling frequency selection operations to a PL for the MBMS service and representing the PL, performing a PF test according to the predetermined PF value, and if the PF test is passed, performing frequency selection to the PL and transmitting a cell update message to the PL.

In accordance with another aspect of the present invention, a radio network controller is provided for controlling frequency selection in a MBMS system when a MBMS session starts. The controller comprises a service controller unit for determining a PL for the MBMS service if the MBMS session starts, and a message transmitter unit for transmitting first PL information including a predetermined PF value for controlling frequency selection operations to the PL and representing the determined PL to UEs located in not the PL but NPLs.

In accordance with another aspect of the present invention, a UE device is provided for performing frequency selection in a MBMS system when a MBMS session starts. The device comprises a radio transmitter/receiver unit for receiving PL information including a predetermined PF value for controlling frequency selection operations to a PL for the MBMS service and representing the PL if the MBMS service session starts, and a service controller unit for performing a PF test according to the predetermined PF value and, if the PF test is passed, performing frequency selection to the PL to control the radio transmission/reception unit such that it transmits a cell update message to the PL.

BRIEF DESCRIPTION OF THE DRAWINGS

The above and other objects, features and advantages of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

Hereinafter, exemplary embodiments of the present invention will be described with reference to the accompanying drawings. In the following description, a detailed description of known functions and configurations incorporated herein will be omitted for clarity and conciseness.

Exemplary embodiments of the present invention described below prevent user equipments (UE), which desire to receive a multimedia broadcast/multicast service (MBMS) service and are located in non preferred frequency layers (NPL), from almost simultaneously moving to a preferred frequency layer (PL) of the MBMS service at the start of the MBMS service when frequency layer convergence (FLC) is applied to a MBMS system.

Figure 1:
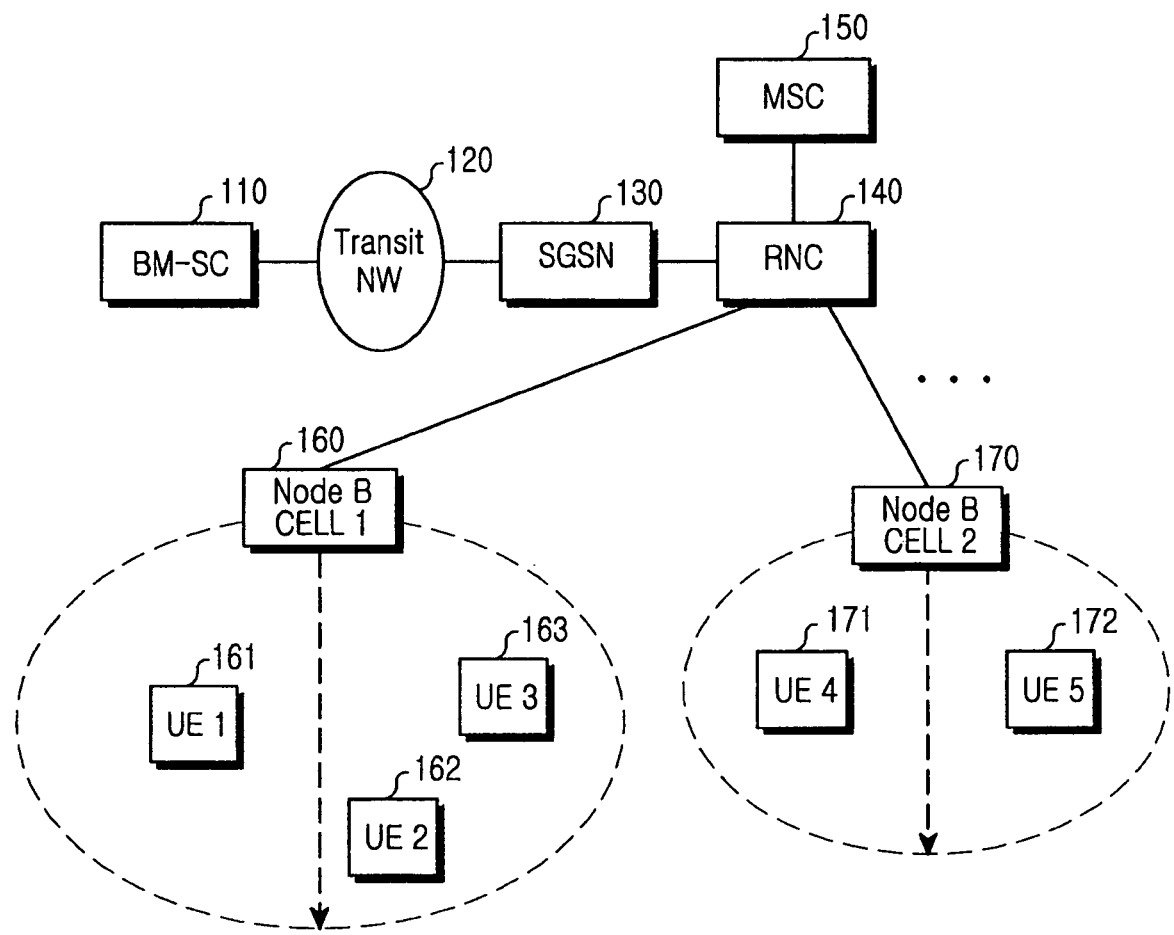
FIG. 1 is a diagram illustrating conventional network architecture for a multimedia broadcast/multicast service (MBMS)
Figure 2:
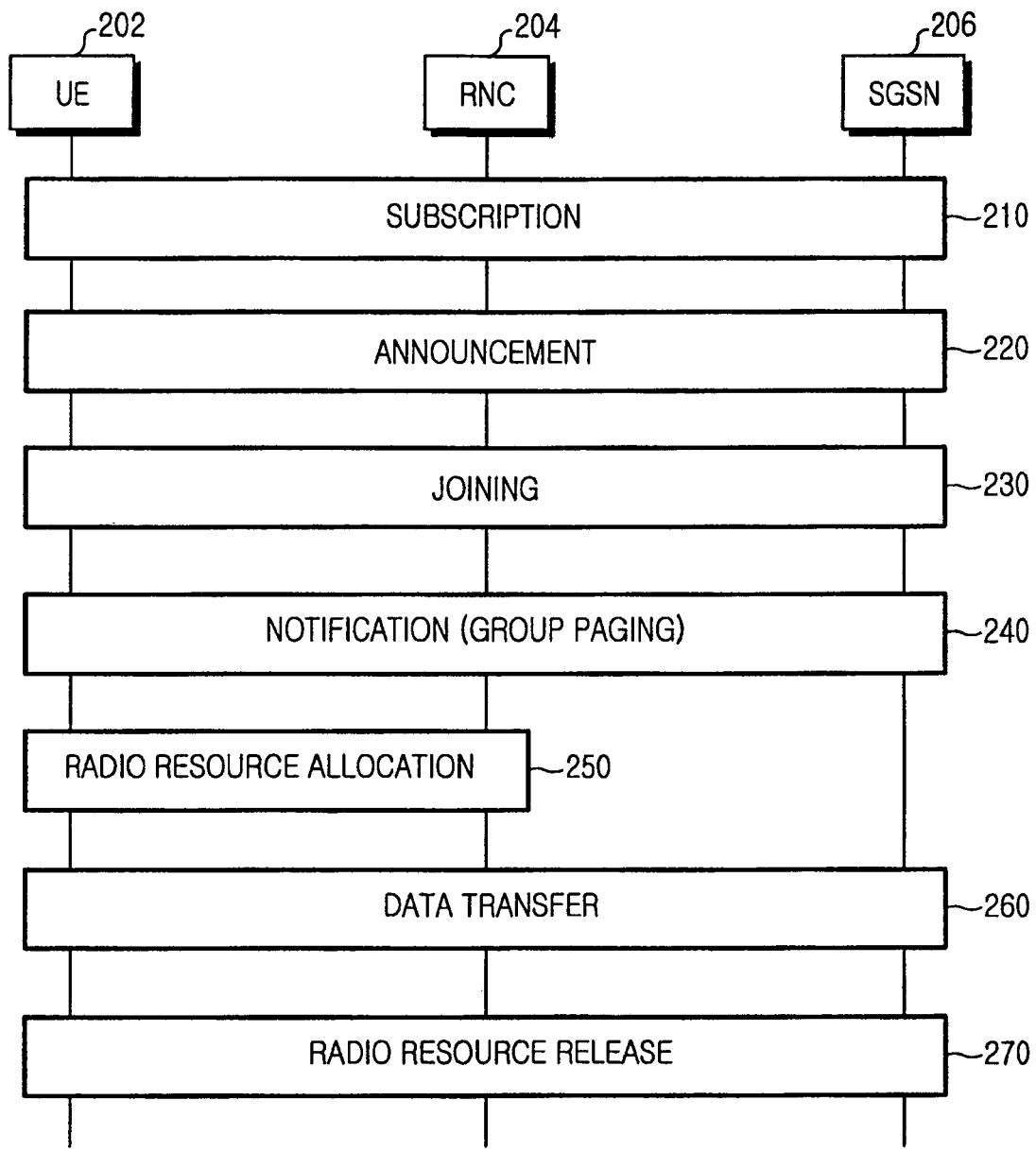
FIG. 2 is a diagram illustrating conventional procedures performed for the MBMS service.
Figure 3:
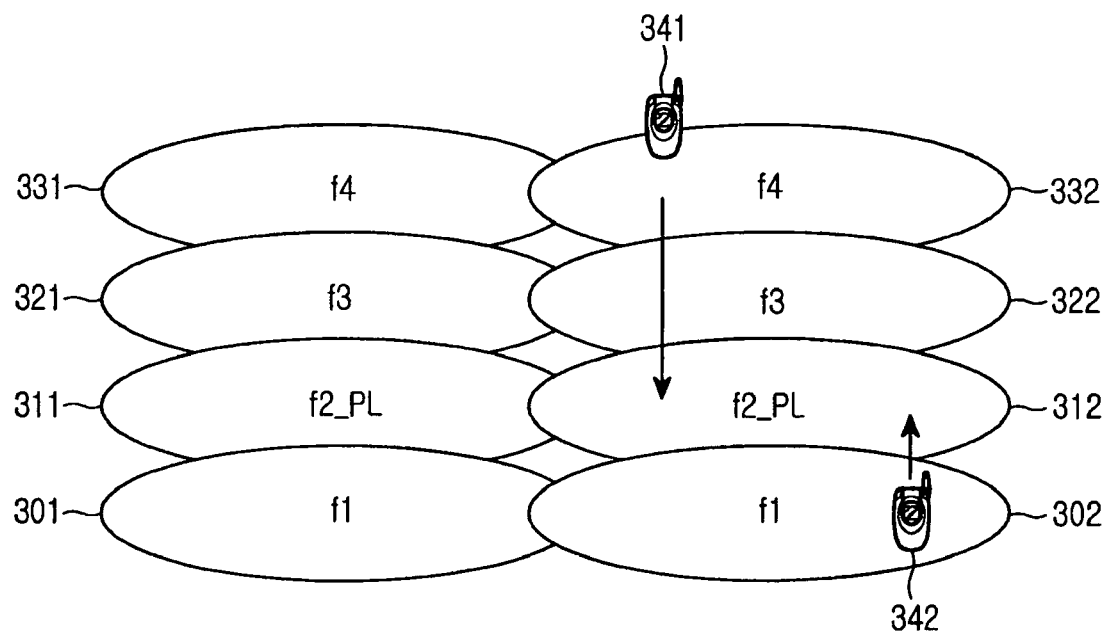
FIG. 3 is a diagram illustrating a layer structure of cells in a frequency layer convergence (FLC) situation according to an exemplary embodiment of the present invention.

FIG. 3 is a diagram illustrating an example of a cell architecture in an MBMS system when the MBMS system is under a FLC situation. As shown in the drawing, cells 301 through 331 and 302 through 332 using different frequencies f1, f2, f3, f4 from each other are geographically co-located in a subordinate position of one node B, and UEs 341, 342 are camping in the cells 302 through 332. Of the frequencies, frequency 2 is established as a MBMS PL. One cell constructed with one frequency in this way is called a layer.

Reference numerals '301' and '302' designate layers constructed with frequency 1 (f1), reference numerals '311' and '312' designate layers constructed with frequency 2 (f2), reference numerals '321' and '322' designate layers constructed with frequency 3 (f3), and reference numerals '331' and '332' designate layers constructed with frequency 4 (f4). In order to provide a MBMS service not in all the cells 301 through 332 of f1 through f4, which are co-located in the same area, but in only one PL, the FLC moves the UEs 341, 342 desiring to receive the MBMS service to the PL.

Since the PL for the MBMS service which the UEs 341, 342 join is frequency 2 (f2), the UE 341 located in the cell 332 of frequency 4 and the UE 342 located in the cell 302 of frequency 1 move to the cell 312 of frequency 2 at the start or in the course of the MBMS service session in order to receive the MBMS service. This is called cell reselection, and particularly the reselection of a cell using other frequency is called frequency selection. At the start of and during the MBMS service session, the UTRAN notifies the UEs located in the cells under the control thereof that the PL is frequency 2. Then, the UEs desiring to receive the MBMS service move to the cells 311, 312 of frequency 2 through the cell reselection.

At this time, the cells 311 and 312 of frequency 2 belong to the PL, and the cells 301, 302, 321, 322, 331 and 332 of frequencies 1, 3 and 4 belong to NPLs. A PL for each MBMS service is determined according to a cell architecture policy of a system operator and radio resource statuses of the cells. As an example, a PL for one MBMS service is applied from beginning to end of the MBMS service session. Information on the determined PLs for the MBMS services is included in MBMS control channel (MCCH) information carried through a MCCH channel (that is, MBMS control channel) and is called FLC information.

The MCCH information is transmitted based on fixed scheduling. A modification period for transmission of the MCCH information is the unit of change of the MCCH information. That is, when an update of the MCCH information is needed, the update of the MCCH information is reflected at the beginning of one modification period, and the updated MCCH information is maintained during the modification period. In the middle of one modification period, an update of the MCCH information cannot occur. Consequently, the MCCH information transmitted during one modification is the same. An update of the MCCH information according to a MBMS event occurring during one modification period is reflected in a next modification period.

Figure 4:
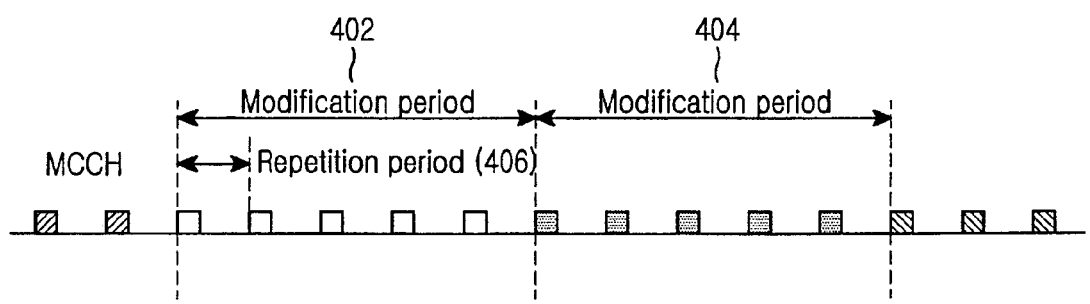
FIG. 4 is a diagram illustrating transmission with respect to scheduling of MBMS control channel (MCCH) information according to an exemplary embodiment of the present invention.

FIG. 4 is a diagram illustrating transmission of MCCH information through a MCCH. As shown in the drawing, MCCH information of the same content is repeatedly transmitted at intervals of a repetition period 406 during each of modification period 402 and 404. The modification period 402 and 404 are integer times of the repetition period 406.

When any MBMS service event for a specific MBMS service, for example, a session start message occurs in the course of the first modification period 402, MCCH information on which the session start message is reflected cannot be transmitted in the middle of the first modification period 404 and is transmitted in the second modification period 404. The MCCH information with the reflected session start message is also repeatedly transmitted at intervals of the repetition period 406 during the second modification period 404.

The MCCH information with the reflected session start message comprises the FLC information instructing to move to the PL for the MBMS service. Thus, the FLC information is also repeatedly transmitted at intervals of the repetition period during at least one modification period.

Figure 5:
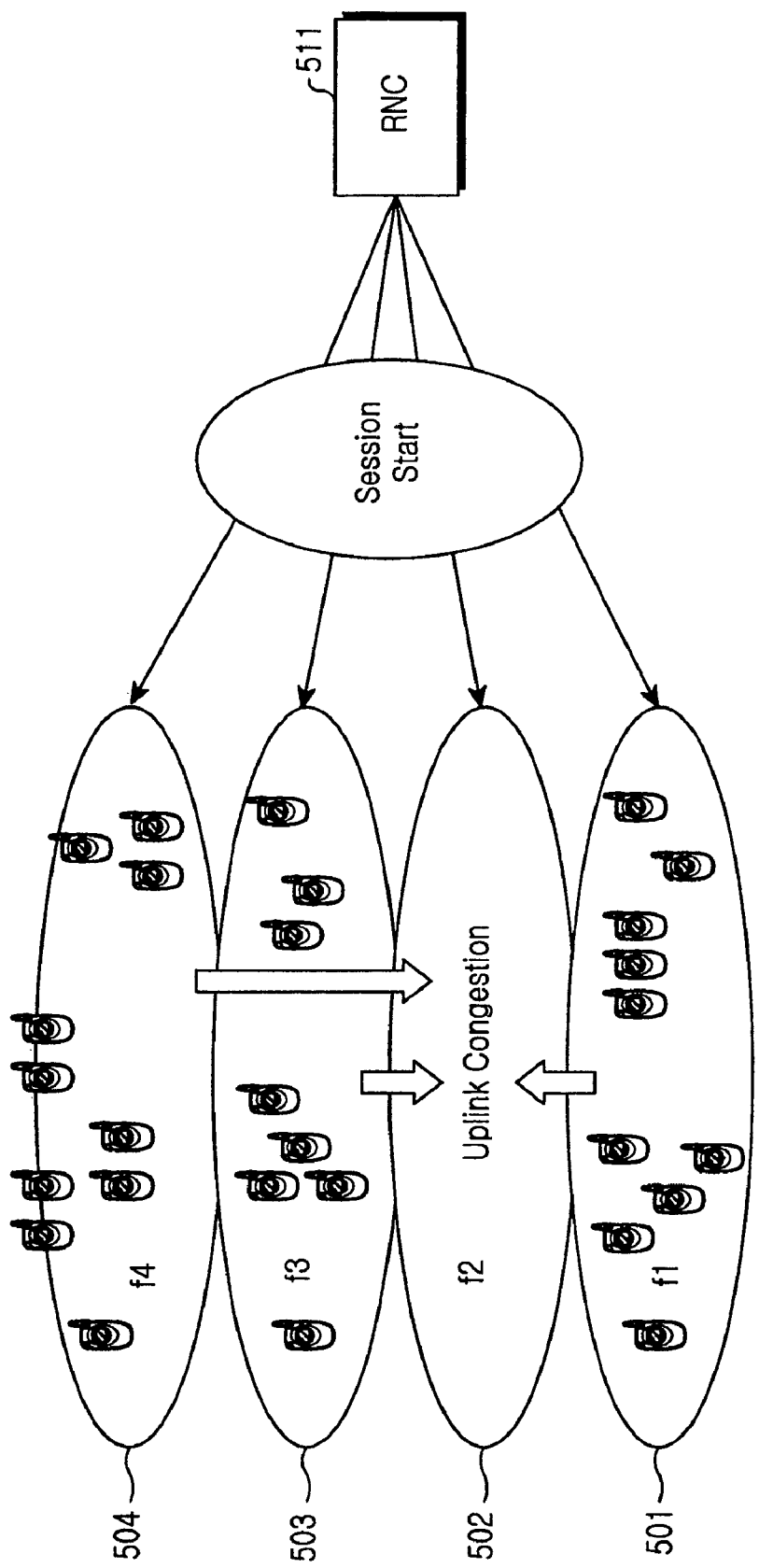
FIG. 5 is a diagram illustrating user equipments (UE) movements between cells at the end of the MBMS service according to an exemplary embodiment of the present invention.

FIG. 5 is a diagram illustrating operations of connected mode UEs, which have no dedicated channels, according to MBMS FLC. Here, the connected mode UEs having no dedicated channels refers to UEs which are in a UTRAN Registration Area (URA)-PCH state or a CELL_PCH state monitoring a paging channel (PCH) or in a CELL_FACH state monitoring a forward access channel (FACH) while existing in a Radio Resource Control (RRC) access mode.

Referring to FIG. 5, reference numerals '501', '502', '503' and '504' designate cells of frequency 1 (f1), frequency 2 (f2), frequency 3 (f3) and frequency 4 (f4), which are co-located in the same service area, and reference numeral '511' designate a RNC controlling the cells 501 through 504. The RNC 511 receive a session start message for a specific MBMS service from a SGSN (not shown), determines a PL of the MBMS service, and then transmits a message informing of the start of the session for the MBMS service to the cells 501 through 504. Since the PL of the MBMS service is frequency 2, the message transmitted to the cells 501 through 504 instructs the UEs located in the cells 501, 503 and 504 of NPLs to move to the cell 502 of frequency 2.

Then, the UEs located in the cells 501, 503 and 504 of the NPLs measure a signal from the cell 502 of the PL and subsequently, if measurements results are sufficiently strong, transmit update messages to the cell 502 of the PL in order to move to the cell 502 of the PL. Such a procedure is called a cell reselection procedure. At this time, before the UEs in the CELL_PCH or CELL_FACH state, which join the MBMS service in the cells 501, 503 and 504 of the NPLs, transmit the cell update messages, they attempt system accesses to the cell 502 of the PL. If the cell 50 of the PL belongs to a different URA from those of the cells 501, 503 and 504 of the NPLs, the UEs in the URS_PCH, which join the MBMS service in the cells 501, 503 and 504 of the NPLs, also attempt system accesses to the cell 502 of the PL.

If the UEs succeed in the system accesses, the cell update messages are transmitted to the cell 502 of the PL. Here, when all the UEs located cells 501, 503 and 504 of the NPLs simultaneously attempt the system accesses to the cell 502 of the PL and transmit the cell update messages, uplink congestion occurs in the cell 502 of the PL. Therefore, in an exemplary embodiment of the present invention, points of time when the UEs located in the cells 501, 503 and 504 of the NPLs perform the cell reselections according to the FLC are decentralized. As a concrete method for this, a PF and a cell reselection period are used.

Figure 6:
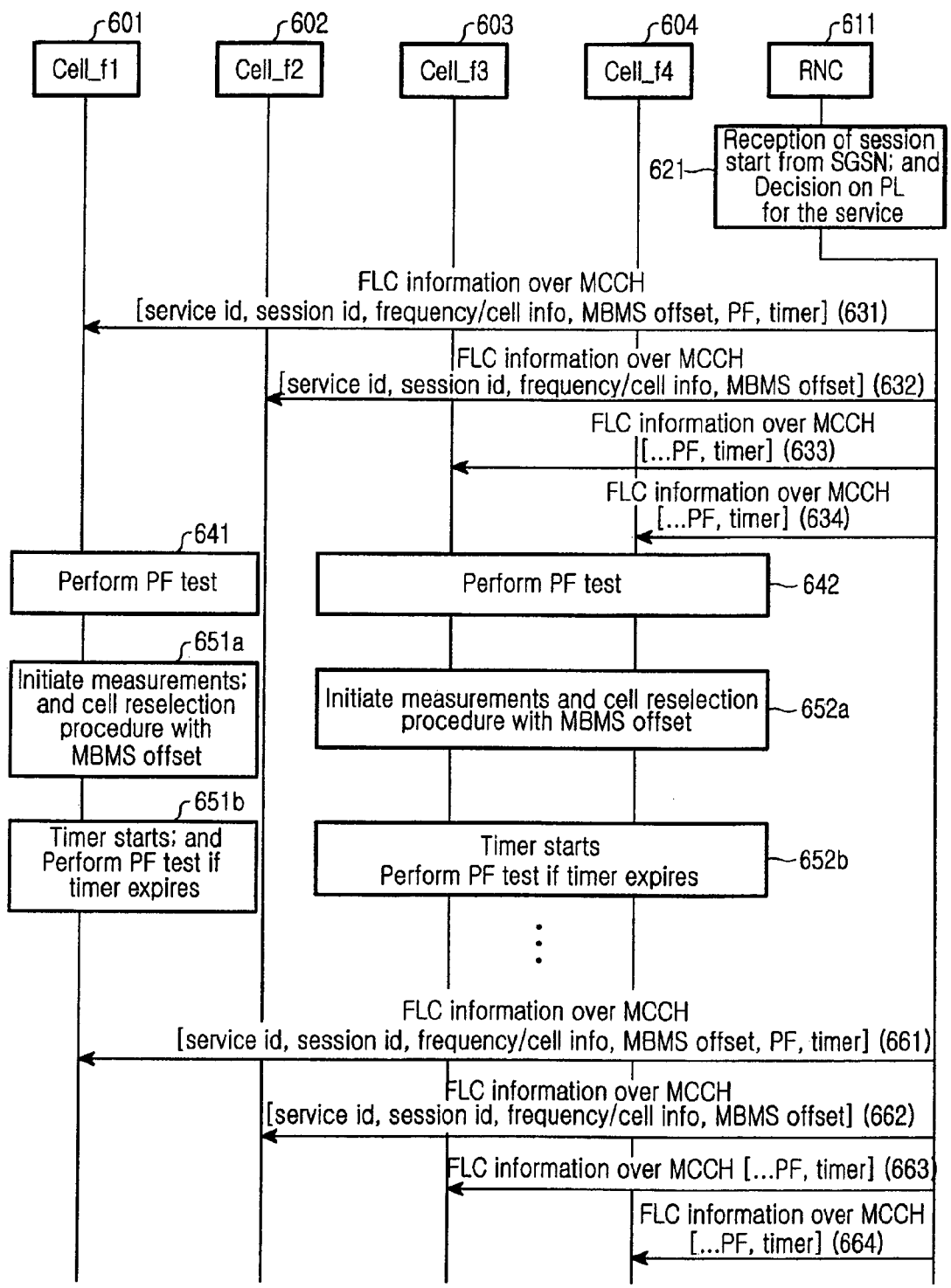
FIG. 6 is a diagram illustrating signaling between a radio network controller (RNC) and cells in accordance with an exemplary embodiment of the present invention.

FIG. 6 is a diagram illustrating signaling between a RNC and cells in a situation of FIG. 5 in accordance with an exemplary embodiment of the present invention. Here, reference numerals '601' through '604' designate cells of frequency 1 (f1), frequency 2 (f2), frequency 3 (f3) and frequency 4 (f4) co-located in the same area, respectively, and reference numeral '611' designate a RNC controlling the cells 601 through 604.

Referring to FIG. 6, in step 621, the RNC 611 receives a session start message for a specific MBMS service and determines a PL for the MBMS service. Here, the RNC 611 determines frequency 2 (f2) as the PL for the MBMS service. In steps 631, 632, 633 and 634, FLC information comprising the session start information and the PL information for the MBMS service are transmitted to the cells 601 through 604. Here, the FLC information to be transmitted to the cell 602 of the PL and the FLC information to be transmitted to the cells 601, 603 and 604 of NPLs comprise in common a service ID, a session ID, frequency/cell information of the PL, a MBMS offset and the like. In addition to such common information, the FLC information to be transmitted to the cells 601, 603 and 604 of the NPLs further comprises a PF value and a timer value representing a cell reselection period. The PF value and the timer value are intended to control the uplink congestion occurring when many UEs in the URA_PCH, CELL_PCH or CELL_FACH state simultaneously access to the cell 602 of the PL, and need not be necessarily transmitted to the cell 602 of the PL.

The service ID and the session ID represent a service ID and a session ID included in the session start message which is received from the SGSN, and the frequency/cell information is information on the PL for the MBMS service. The UEs desiring to receive the MBMS service and located in the cells 601, 603 and 604 of the NPLs recognize a frequency or a cell, which is determined as the PL, by receiving the FLC information. The MBMS offset represents a parameter which is applied in order to enhance the probability of enabling the UEs desiring to receive the MBMS service and located in the NPLs to reselect a frequency/cell to the PL and lower the probability of enabling the UEs located in the PL to reselect a frequency/cell to the NPLs. That is, using the MBMS offset, the RNC 611 causes the UEs located in the PL to continually stay in the PL and enhances the probability of enabling the UEs located in the NPLs to move to the PL.

The PF value and the timer value function to decentralize points of time when the UEs in the CELL_PCH, URA_PCH or CELL_FACH state, which desire to receive the MBMS service while being located in the NPLs, reselect a cell to the PL. That is, the UEs of NPLs, having received the PF value and the timer value, must not perform the cell reselection for moving to the PL before a PF test according to the PF value is passed. The UEs of the NPLs creates a random value of 0 to 1 to compare the random value with the PF value, and determine as passing the PF test if the random value is equal to or less than the PF value and determines as not passing the PF test if not so. The UEs having not passed the PF test waits for a time corresponding to the timer value and then perform the PF again.

The PF value and the timer value can prevent a problem of the uplink congestion shown in FIG. 5 by decentralizing the points of time when the UEs located in the NPLs perform the cell reselection for the PL. The timer value may be clearly signaled as in FIG. 6, but a random fixed value may be used as the timer value or the timer value may be set to the same value as the repetition period. In this case, the timer value need not be signaled to the UEs. If the timer value is set to the same value as the repetition period, the UEs reattempt the PF test by using a PF value which is transmitted during a next repetition period after they fail in the PF test.

As shown in steps 661, 662, 663 and 664, the FLC information is retransmitted a repetition period next to one modification period. At this time, the PF value and the timer value in the FLC information may be updated even during one modification period. For example, the PF value transmitted during steps 661, 663 and 664 may become greater than the previous PF value of steps 631, 633 and 634. That is, by gradually increasing the PF value included in the FLC information which is periodically transmitted during one modification period, the RNC 611 ensures that the UEs located the NPLs perform the cell reselection to the PL within one modification period. At this time, the RNC 611 determines the PF value according to the number of URA_PCH, CELL_PCH or CELL_FACH UEs remaining in the NPLs.

In steps 641 and 642, the UEs of the NPLs perform the PF test according to the PF value included in the FLC information which is transmitted in steps 631, 633 and 634. In steps 651.b and 652.b, the UEs having passed the PF test initiate the cell reselection using the MBMS offset. In steps 651.b and 652.b, the UEs having not passed the PF test begin to operate a timer according to the timer value, and perform the PF test when the timer expires. Although not shown in FIG. 6, if the PF value or the timer value is updated during one modification period, each of the UEs performs the PF test by using the updated PF or timer value.

Figure 7:
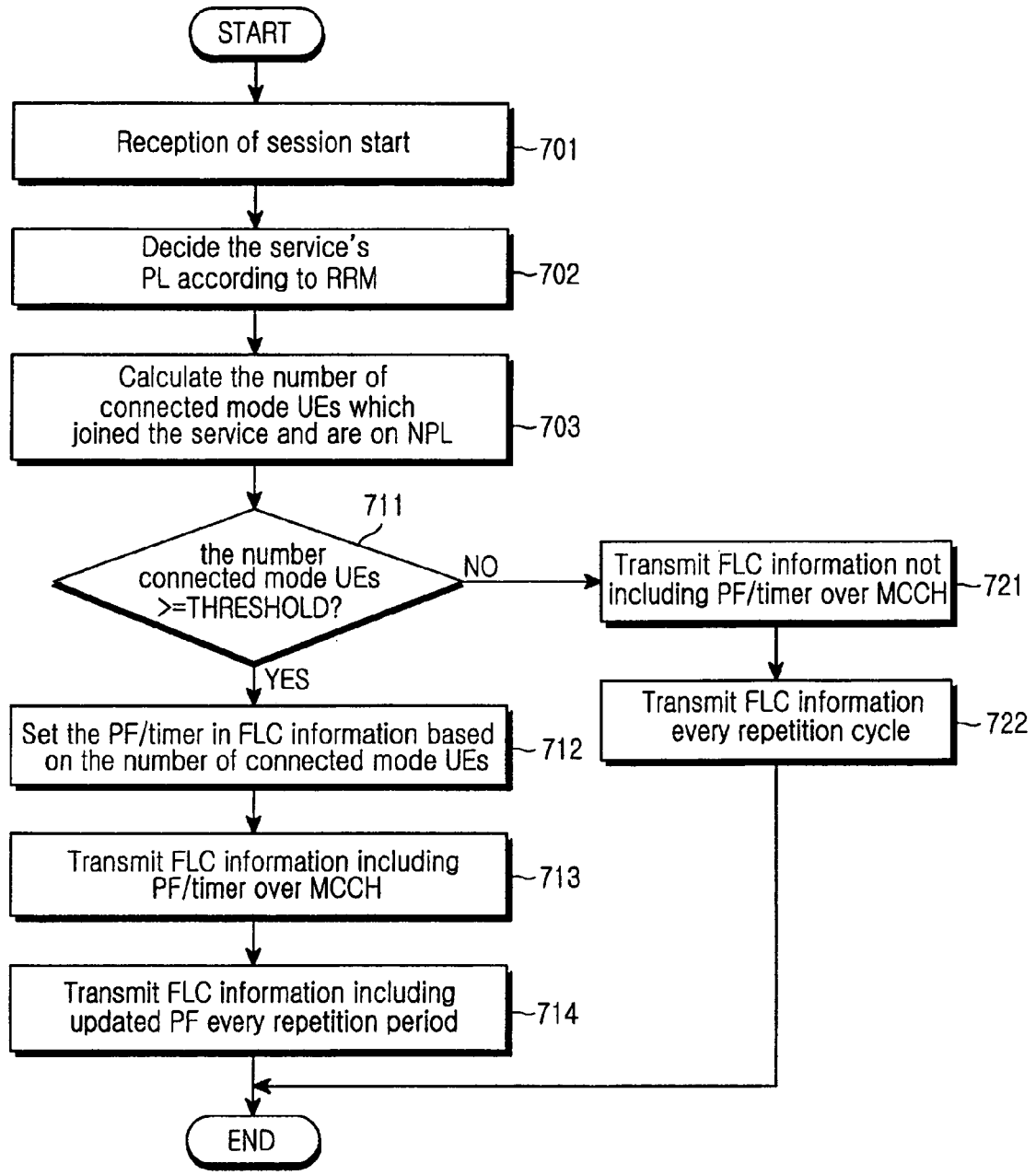
FIG. 7 is a flowchart illustrating operations of the RNC in accordance with an exemplary embodiment of the present invention.

FIG. 7 is a flowchart illustrating operations of a RNC in accordance with an exemplary embodiment of the present invention.

Referring to FIG. 7, in step 701, a session start message for a specific MBMS service is received from a SGSN to a RNC. In step 702, the RNC determines a PL of the MBMS service according to a RRM. In step 703, the RNC calculates the number of UEs in the URA_PCH, CELL_PCH or CELL_FACH state, which join the MBMS service while being located in cells of NPLs. In step 711, the RNC determines if the calculated number is equal to or greater than a predetermined threshold value. If the calculated number is equal to or greater than the predetermined threshold value, the RNC determines that uplink congestion may occur when the UEs almost simultaneously perform cell reselection to a cell of the PL, and sets a PF value, a timer value and other information into FLC information in step 712, and then transmits the FLC information over a MCCH at step 713. At this time, the FLC information to be transmitted to the cell, of the PL may not comprise the PF value and the timer value.

In step 714, FLC information comprising a PF value, which is updated every repetition period, is transmitted. That is, in step 714, the RNC calculates the number of UEs in the URA_PCH, CELL_PCH or CELL_FACH state, which join the MBMS service while being located in the cells of NPLs, every repetition period, updates a PF value according to the calculated number, and then transmits FLC information comprising the updated PF value. Otherwise, the RNC increases the PF value by a predetermined value every repetition period and then transmits FLC information comprising the increased PF value every repetition period.

If the calculated number is less than a predetermined threshold value in step 711, the RNC sets FLC information comprising no PF value and no timer value and transmits the FLC information over the MCCH at steps 721 and 722. In such a case, the UEs in the URA_PCH, CELL_PCH or CELL_FACH state, which join the MBMS service while being located in the cells of NPLs, perform the cell reselection to the PL by measuring the intensity of a signal from the cell of the PL as soon as receiving the FLC information.

Figure 8:
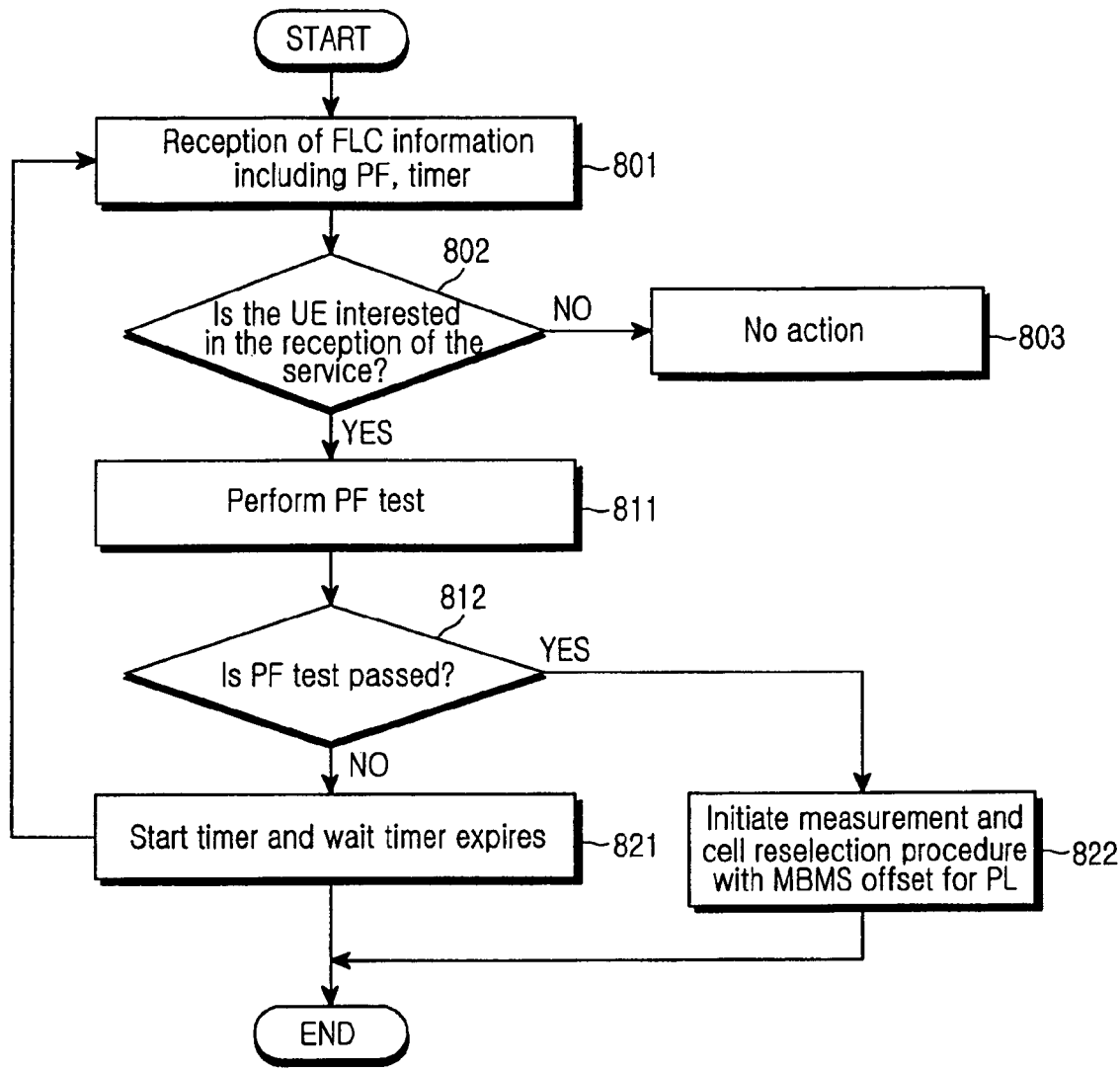
FIG. 8 is a flowchart illustrating operations of the UE in accordance with an exemplary embodiment of the present invention.

FIG. 8 is a flowchart illustrating operations of a UE in accordance with an exemplary embodiment of the present invention.

Here are illustrated operations of an access mode UE having no dedicated channel, that is, a UE in the URA_PCH, CELL_PCH or CELL_FACH state. Processes as described below are performed during one modification period where FLC information is received after the session start.

Referring to FIG. 8, in step 801, the UE receives FLC information from a RNC, and extracts a PF value and a timer value together with a service ID, a session ID, frequency/cell information of a PL and a MBMS offset from the FLC information. In step 802, the UE determines according to the service ID and the session ID if the FLC information is directed toward a MBMS service which the UE desires to receive. If the FLC information is directed toward the MBMS service which the UE desires to receive, in step 811, the UE performs a PF test by using the PF value. Otherwise, no action is taken at step 803. In the PF test, the UE creates a random value of 0 to 1 to compare the random value with the PF value. If the random value is equal to or less than the PF value, the UE passes the PF test, and if not so, the UE does not pass the PF test.

In step 812, the UE decides if it has passed the PF test, and proceeds to step 822 if having passed the PF test. In step 822, the UE initiates cell reselection for the PL according to the frequency/cell information of the PL by using the MBMS offset. That is, the UE attempts a system access to a cell of the PL, and transmits a cell update message to the cell of the PL if the cell of the PL permits the system access. In contrast with this, if the UE has not passed the PF test, it proceeds to step 821 to operate a timer according to the timer value and waits for the expiration of the timer. If the timer expires, the UE returns to step 801.

Figure 9:
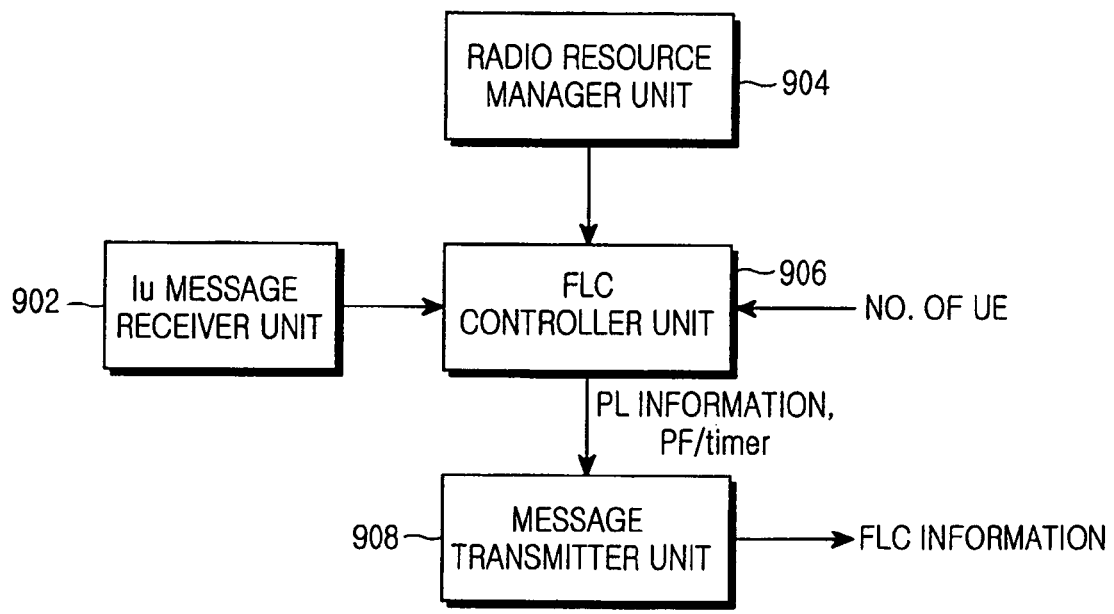
FIG. 9 is a block diagram illustrating a structure of the RNC in accordance with an exemplary embodiment of the present invention.

FIG. 9 is a block diagram illustrating a structure of a RNC, which transmits FLC information, in accordance with an exemplary embodiment of the present invention. As shown in the drawing, the RNC comprises an Iu message receiver unit 902, a radio resource manager unit 904, a FLC controller unit 906 and a message transmitter unit 908. In the drawing, a broadcast transmitter unit for transmitting broadcast data of a MBMS service is not shown.

Referring to FIG. 9, the radio resource manager unit 904 manages radio resources of cells under the control of the RNC, and measures the amount of radio resources of the cells, which is available frequency by frequency. If a session start message for a specific MBMS service is received to the Iu message receiver unit 902, the FLC controller unit 906 determines a PL for the MBMS service according to the amount of radio resources of the cells, which is available frequency by frequency, and compares the number of UEs joining the MBMS service and located in NPLs of the MBMS service with a predetermined threshold value. If the number of the UEs is equal to or greater than the predetermined threshold value, the FLC controller unit 906 provides PL information representing the determined. PL as well as a PF value and a timer value determined for the MBMS service to the message transmitter unit 908. The message transmitter unit 908 creates FLC information comprising the PF and timer values together with a service ID of the MBMS service, a session ID, frequency/cell information of the PL and a MBMS offset, and puts the FLC information into a message comprising general information related to the MBMS service to transmit the message comprising the FLC information.

Figure 10:
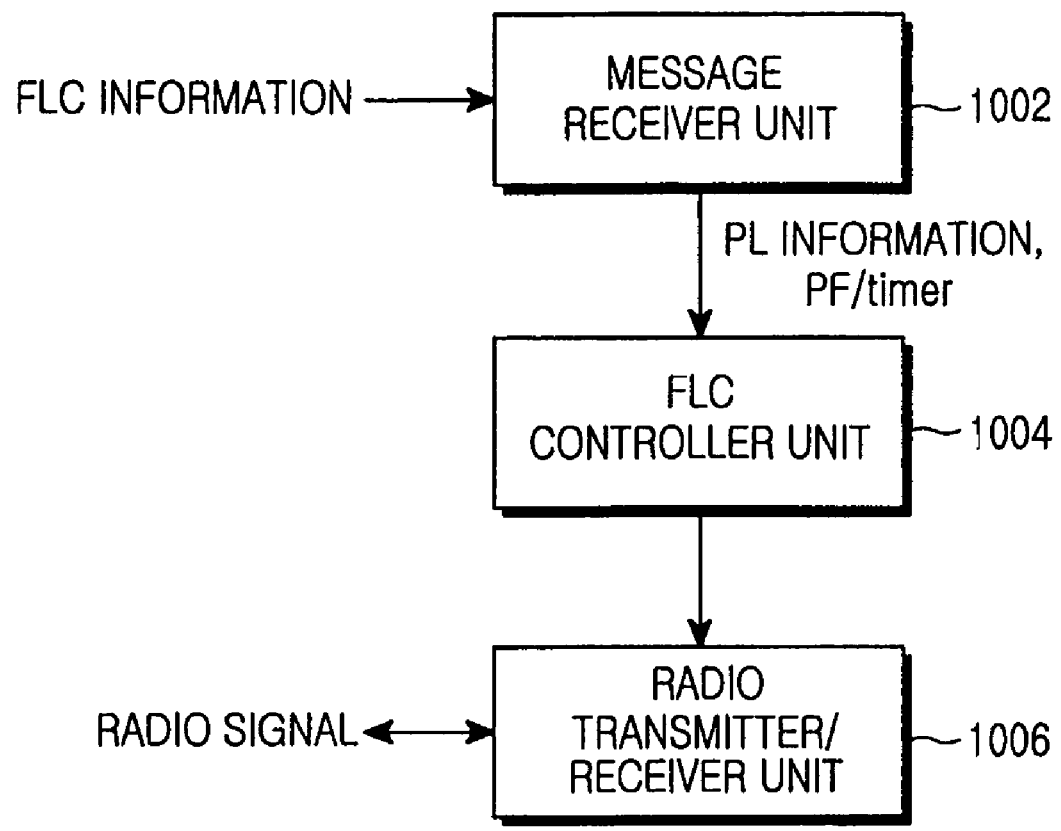
FIG. 10 is a block diagram illustrating a structure of the UE in accordance with an exemplary embodiment of the present invention.

FIG. 10 is a block diagram illustrating a structure of a UE capable of using a PL for a MBMS service in accordance with an exemplary embodiment of the present invention. As shown in the drawing, the UE comprises a message receiver unit 1002, a FLC controller unit 1004 and a radio transmitter/receiver unit 1006.

Referring to FIG. 10, the message receiver unit 1002 receives a message comprising general information related to the MBMS service which the UE joins, and acquires FLC information representing a PL of the MBMS service from the message. The FLC controller unit 1004 performs the procedures shown in FIG. 8. That is, it extracts a PF value and a timer value from the FLC information, and performs a PF test by using the PF value. If the UE has passed the PF test, the FLC controller unit 1004 determines to perform measurement and frequency selection procedures for moving to the PL of the MBMS service. Then, the radio transmitter/receiver unit 1006 measures the intensity of a signal from a cell of the PL to attempt a system access to the cell of the PL, and transmits a cell update message to the cell of the PL. In contrast, if the UE has not passed the PF test, the FLC controller unit 1004 operates a timer and waits for the expiration of the timer while not performing the cell reselection procedures.

As describe above, in exemplary implementations of the present invention, UEs perform cell reselection through a PF test according to a PF value and a timer value in a MBMS system to which a FLC technology is applied, thereby maintaining the degree of congestion of cells and the load of signal transmission at appropriate levels.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for controlling frequency selection in a multimedia broadcast/multicast service (MBMS) system when a MBMS service session starts, the method comprising the steps of:
   if the MBMS service session starts, determining, by a service controller unit, a preferred frequency layer (PL) for the MBMS service; and
   transmitting, by a message transmitter unit, first PL information comprising a predetermined probability factor (PF) value for controlling frequency selection operations to the PL and representing the determined PL to connected mode user equipments (UEs) located in not the PL but in non-preferred frequency layers (NPL),
   wherein the PF decentralizes points of time when the connected mode UEs located in the NPL perform the frequency selection.

2. The method as claimed in claim 1, wherein the PF value is gradually increased whenever the first PL information is transmitted during one modification period in which the first PL information is repeatedly transmitted.

3. The method as claimed in claim 1, wherein the PF value is determined according to the number of UEs which are located in not the PL but the NPLs, and have no dedicated channel while joining the MBMS service.

4. The method as claimed in claim 3, further comprising the steps of:
   calculating the number of the connected mode UEs which are located in not the PL but the NPLs, and have no dedicated channel while joining the MBMS service;
   determining whether or not the calculated number is equal to or greater than a predetermined threshold value; and
   if the calculated number is equal to or greater than the predetermined threshold value, determining to comprise the PF value in the first PL information.

5. The method as claimed in claim 4, further comprising the step of, if the calculated number is less than the predetermined threshold value, transmitting second PL information comprising no PF value and representing the determined the PL to the connected mode UEs located in the cells of the PL.

6. The method as claimed in claim 5, wherein the first and second PL information comprise in common a service ID and a session ID for the MBMS service, frequency/cell information representing the PL, and a MBMS offset for controlling the frequency selection operations.

7. The method as claimed in claim 1, wherein the first PL information further comprises a timer value representing a time during which, from among the connected mode UEs located in not the PL but the NPLs, the UEs having not passed a PF test wait for a next PF test.

8. A method for performing frequency selection in a multimedia broadcast/multicast service (MBMS) system when a MBMS service session starts, the method comprising the steps of:
   if the MBMS service session starts, receiving, by a radio transmitter/receiver unit, preferred frequency layer (PL) information comprising a predetermined probability factor (PF) value for controlling frequency selection operations to a PL for the MBMS service and representing the PL;
   performing, by a service controller unit, a PF test according to the predetermined PF value; and
   if the PF test is passed, performing, by the service controller unit, frequency selection to the PL and transmitting a cell update message to the PL,
   wherein the PF decentralizes points of time when the frequency selection is performed.

9. The method as claimed in claim 8, wherein the PL information comprises a service ID and a session ID for the MBMS service, frequency/cell information representing the PL, and a MBMS offset for controlling the frequency selection operations.

10. The method as claimed in claim 8, further comprising the steps of:
    if the PF test is not passed, initiating to operate a timer according to a predetermine timer value or a timer value included in the PL information; and
    if the timer expires, performing the PF test again.

11. A radio network controller for controlling frequency selection in a multimedia broadcast/multicast service (MBMS) system when a MBMS session starts, the controller comprising:
    a service controller unit for determining a preferred frequency layer (PL) for the MBMS service if the MBMS session starts; and
    a message transmitter unit for transmitting first PL information comprising a predetermined probability factor (PF) value for controlling frequency selection operations to the PL and representing the determined PL to user equipments (UEs) located in not the PL but non preferred frequency layers (NPL),
    wherein the PF decentralizes points of time when the connected mode UEs located in the NPL perform the frequency selection.

12. The radio network controller as claimed in claim 11, wherein the PF value is gradually increased whenever the first PL information is transmitted during one modification period in which the first PL information is repeatedly transmitted.

13. The radio network controller as claimed in claim 11, wherein the PF value is determined according to the number of UEs which are located in not the PL but the NPLs, and have no dedicated channel while joining the MBMS service.

14. The radio network controller as claimed in claim 13, wherein the service controller unit calculates the number of the connected mode UEs, which are located in not the PL but the NPLs and have no dedicated channel while joining the MBMS service, to determine whether or not the calculated number is equal to or greater than a predetermined threshold value, and determines to comprise the PF value in the first PL information if the calculated number is equal to or greater than the predetermined threshold value.

15. The radio network controller as claimed in claim 14, wherein the service controller unit controls the message transmitter unit such that, if the calculated number is less than the predetermined threshold value, it transmits second PL information comprising no PF value and representing the determined the PL to the connected mode UEs located in the cells of the PL.

16. The radio network controller as claimed in claim 15, wherein the first and second PL information comprise in common a service ID and a session ID for the MBMS service, frequency/cell information representing the PL, and a MBMS offset for controlling the frequency selection operations.

17. The radio network controller as claimed in claim 11, wherein the first PL information further comprises a timer value representing a time during which, from among the connected mode UEs located in not the PL but the NPLs, the UEs having not passed a PF test wait for a next PF test.

18. A user equipment (UE) device for performing frequency selection in a multimedia broadcast/multicast service (MBMS) system when a MBMS session starts, the device comprising:

a radio transmitter/receiver unit for receiving preferred frequency layer (PL) information comprising a predetermined probability factor (PF) value for controlling frequency selection operations to a PL for the MBMS service and representing the PL if the MBMS service session starts; and a service controller unit for performing a PF test according to the predetermined PF value and, if the PF test is passed, performing frequency selection to the PL to control the radio transmission/reception unit such that it transmits a cell update message to the PL, wherein the PF decentralizes points of time when the frequency selection is performed.

19. The UE device as claimed in claim 18, wherein the PL information comprises a service ID and a session ID for the MBMS service, frequency/cell information representing the PL, and a MBMS offset for controlling the frequency selection operations.

20. The UE device as claimed in claim 18, wherein, if the PF test is not passed, the service controller unit initiates to operate a timer according to a predetermine timer value or a timer value included in the PL information, and performs the PF test again if the timer expires.

* * * * *